United States Patent [19]
Simpson

[11] 3,801,233
[45] Apr. 2, 1974

[54] VALVE ASSEMBLIES
[75] Inventor: Philip J. Simpson, Plymouth, Mass.
[73] Assignee: Maurice R. Boiteau, West Newton, Mass. ; a part interest
[22] Filed: Dec. 7, 1971
[21] Appl. No.: 205,515

[52] U.S. Cl............... 417/441, 137/540, 251/249.5
[51] Int. Cl. ... F04b 23/00, F16k 15/02, F16k 31/52
[58] Field of Search ............ 417/295, 441; 173/169; 251/249.5, 250.5; 137/540

[56] References Cited
UNITED STATES PATENTS
2,788,170  4/1957  Kato et al. .................... 417/441 X
2,463,809  3/1949  Sacchini.......................... 251/249.5
1,420,429  6/1922  Hewlett............................ 137/540

FOREIGN PATENTS OR APPLICATIONS
23,898   11/1905  Great Britain ..................... 137/540
685,200  12/1952  Great Britain ..................... 137/540
178,927   4/1962  Sweden............................. 417/441

Primary Examiner—C. J. Husar
Assistant Examiner—Leonard Smith
Attorney, Agent, or Firm—Maurice R. Boiteau

[57] ABSTRACT

There is disclosed in the specification a valve assembly adapted to be interposed between a high pressure precision metering pump and its usual mounting bracket. The valve assembly includes a manually operated valve for interrupting the flow of liquid from a master pump to the metering pump whenever the metering pump is to be replaced. There are also included in a common body with the manually operated valve, automatic valves for isolating one or two high pressure outlets whenever the metering pump is stopped either intentionally or as a result of a malfunction.

5 Claims, 7 Drawing Figures

INVENTOR.
PHILIP J. SIMPSON

INVENTOR.
PHILIP J. SIMPSON

VALVE ASSEMBLIES

The present invention relates generally to improvements in compact valve assemblies for controlling the flow of fibre forming liquids to and from high pressure metering pumps which force the liquid accurately through spinnerets to form filaments. More particularly in at least one aspect the present invention is directed to specific problems occuring when the liquid is a thermoplastic material such as nylon. In the present specification, the valve assembly will be described in association with a pump such as that disclosed in United Stated Letters Patent No. 2,818,023 issued Dec. 31, 1957 upon application of Harold R. W. Lundstrom.

In the manufacture of nylon thread, molten nylon is delivered by means of a relatively low pressure high capacity master pump to a plurality of accurate high pressure metering pumps which in turn are connected directly to spinnerets through which the filaments are extruded. Metering pumps according to the Lundstrom patent are dual gear pumps having two separate output streams each directed to an individual spinneret but single output pumps may also be employed. In any event, the molten nylon reaching the metering pump does so at a temperature of approximately 600°F. and usually at a pressure in the neighborhood of 1500 pounds per square inch. Typically the output of the metering pump is at a pressure on the order of 5000 pounds per square inch. Because of the high pressure output and extreme accuracy of the metering pumps, they are constructed to extremely close fits. Accordingly, minute impurities, wear of pump parts or gouging of one part into another cause the pump to stop. The pump must then be removed from the line, the nylon in the pump which has solidified upon cooling must be burned out, the pump disassembled and rebuilt. Removal of the pump from the line must be accomplished with extreme care since the inlet side of the pump is connected to hot molten nylon at 1500 pounds per square inch and the outlet side to far higher pressures.

In addition to the high temperatures and pressures of the molten nylon, a further problem is the deterioration of nylon between the master pump and the metering pump when the flow of molten nylon is stopped in accordance with the conventional practice. The flow is usually stopped by causing a slug of nylon to solidify in the line leading up to the defective metering pump. After a new pump has been installed, the solidified slug must be melted by overheating the conduit at the slug. The overheating causes the nylon in the conduit to deteriorate and it must be purged from the system in order to avoid a defective product. It is thus seen that the conventional practices followed in the replacement of pumps are not only potentially dangerous from the point of view of the high temperature and pressures of the molten nylon but are otherwise time consuming and inefficient in that a defective product may be produced if deteriorated nylon is not completely purged from the line.

It is accordingly an object of the present invention to permit the removal of inoperative metering pumps from spinneret circuits quickly and in complete safety.

Another object is to eliminate the need for purging of lines to metering pumps after the replacement of a pump.

Still another object is to interrupt the flow of material as close to the metering pump as possible while permitting an essentially normal installation of the pump.

The foregoing objects are achieved according to the present invention by a compact valve assembly including a combination of valves constructed in a common body for performing a plurality of valving functions. A manually operated valve is provided for interrupting the flow from the master pump to the metering pump and in addition there is an automatic valve for each outlet stream from the metering pump. Each stream, whether one or two, is interrupted by a spring loaded valve which normally remains open under the pressure of the stream but which close automatically if the high pressure from the metering pump is interrupted for any reason. Since the stream to the metering pump is interrupted by the manually operated valve and each outlet stream is isolated by an automatic valve, the metering pump may be quickly replaced in the event either of malfunction or of stoppage.

According to another feature, each of the valves includes a spool formed in such a way that slugs of solidifed synthetic material are substantially eliminated. This is accomplished by including a reduced diameter ahead of a closure surface on each spool to fill a passage in the valve body ahead of each valve seat so that there is no space into which molten nylon isolated from the main stream may solidify.

The foregoing objects and features and numerous advantages to be derived from the present invention will be more fully understood from a detailed description of an illustrative embodiment taken in connection with the accompanying drawings in which.

Figure 1:
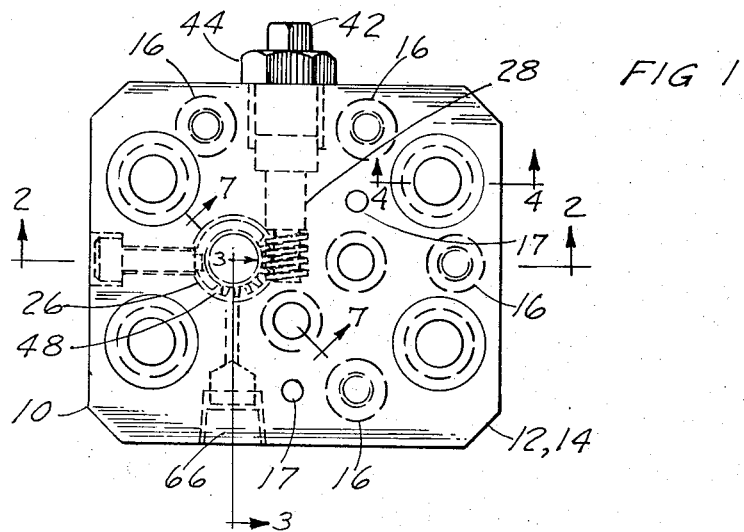
FIG. 1 is a plan view of a valve assembly according to the present invention shown at approximately full size and intended for a common application.
Figure 2:
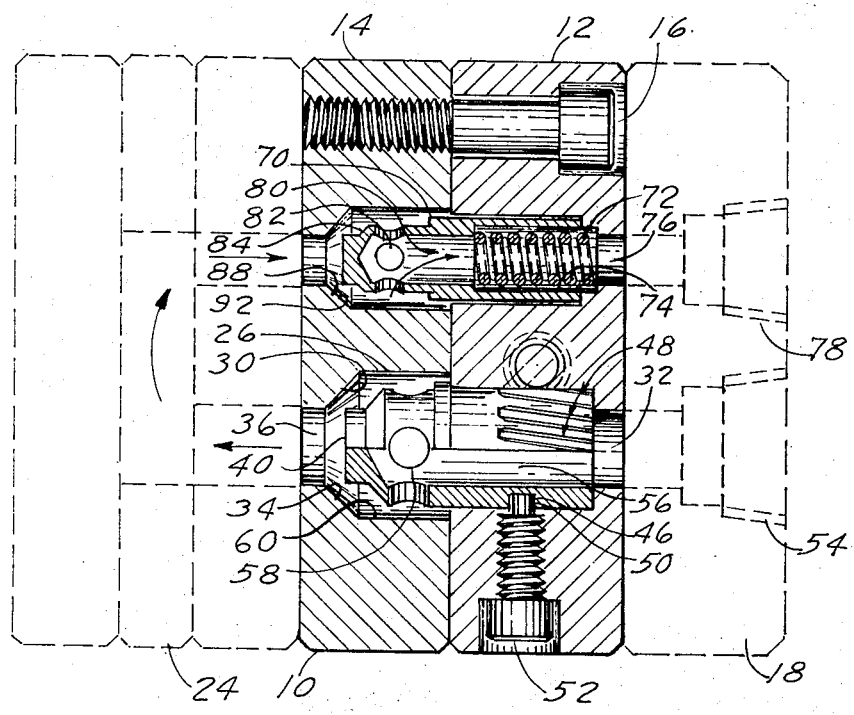
FIG. 2 is a view in cross-section and on an enlarged scale taken along the line 2—2 of FIG. 1 and showing valves for controlling an inlet and an outlet flow path.
Figure 3:
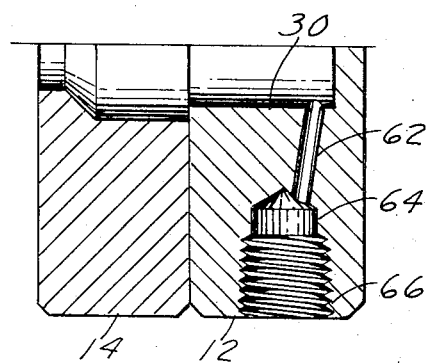
FIG. 3 is a fragmentary detail view in cross-section taken along the line 3—3 of FIG. 1 and depicting a bleeder passage through the valve body.
Figure 4:
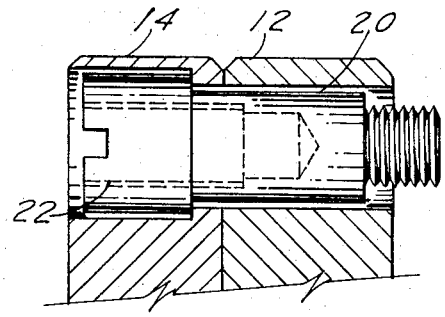
FIG. 4 is a detail view also in cross-section and on an enlarged scale taken along the line 4—4 of FIG. 1 and depicting a combination fastener forming a part of the pump assembly.
Figure 5:
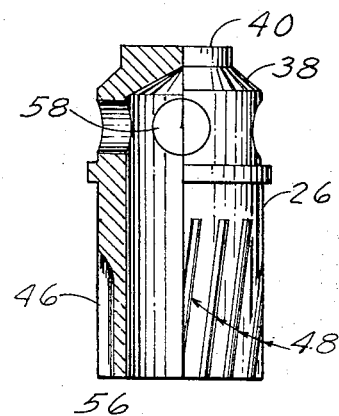
FIG. 5 is a detail view on an enlarged scale depicting a manually actuatable spool for closing the inlet passage to the metering pump.
Figure 6:
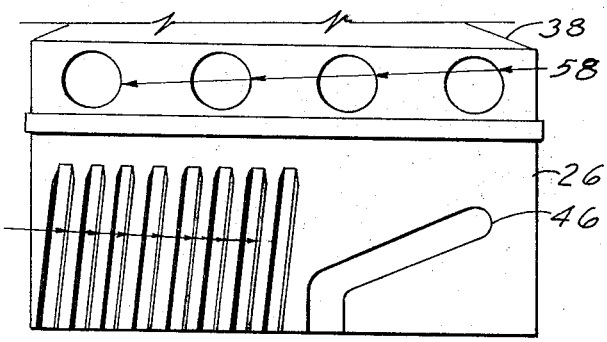
FIG. 6 is a development of the valve spool of FIG. 5.

Turning now to the drawings, particularly FIGS. 1 and 2, there is shown a pump assembly including a body indicated generally at 10 and comprising a base plate 12 and a cover plate 14 clamped together by screws 16 and maintained in register by dowels 17. The valve body 10 is secured to a mounting bracket 18 by means of shoulder screws 20 tapped at 22 to receive screws for retaining a metering pump indicated generally at 24 on the valve body. Conventionally, the metering pump which is one according to the above-identified Lundstrom Patent would be mounted directly upon the bracket 18 which is appropriately perforated to provide inlet and outlet passages in register with those of the pump. Neither the bracket 18 nor the pump 24 forms a part of the present invention but merely constitute part of the environment to which the valve assembly of the present invention is adaptable.

In the present valve assembly, the inlet stream to the pump 24 is controlled by a manually operated valve comprising a spool indicated generally at 26 and an actuating worm 28. The spool 26 is slidably guided in a counterbore 30 of an inlet passage 32 and is concentric with a valve seat 34 and a restricted outlet passage or throat 36 in the cover plate 14. The spool 26 is advanced to the left as seen in FIG. 2 to close the inlet to the pump 24 by turning the worm 28 so that an angular sealing surface 38 engages the seat 34 and a reduced pilot diameter 40 substantially fills the outlet passage 36 to prevent the formation of a solidified slug in the passage when the spool 26 is moved to its closed position.

The worm 28 is journalled in the baseplate 12 and extends conveniently above the body 10 to a square shank 42 engagable by an appropriate wrench for turning the worm to actuate the spool 26. A retainer 44 is perforated to receive the shank 42 and threaded into the plate 12 to provide a running fit for an enlarged diameter on the worm. The opening and closing of the spool 26 is accomplished by a combination of an angular motion about its axis and a translation into a longitudinal motion by the use of a cam slot 46. To provide the angular motion of the spool 26, the worm 28 meshes with helical gear teeth 48 cut in the outer surface of the spool. The cam slot 46 is cut through part of the thickness of the spool wall and is engaged by a reduced end diameter 50 of a self locking follower screw 52 engaging the threads of a tapped opening in the base plate 12. The angular motion imparted to the spool 26 by the worm 28 is translated by the cam slot 46 into a longitudinal motion from the position depicted in FIGS. 2 and 7 to a closed position in which the sealing surface 38 engages the valve seat 34 and the outer end of the pilot diameter 40 is nearly flush with the outer surface of the cover plate 14. Reverse rotation of the worm 28 returns the spool 26 to the position depicted in FIG. 2. In the open position depicted in FIG. 2, molten nylon flows to the pump 24 through the spool 26 from an inlet opening 54 in the bracket 18, through the passage 32 in the base plate 12, through a longitudinal interior passage 56 of the spool 26 and then radially outwardly through openings 58 into a counterbore 60. The molten material then flows between the valve body and the counterbore 60 and through the passage 36 to an aligned inlet in the body of the pump 24.

Figure 7:
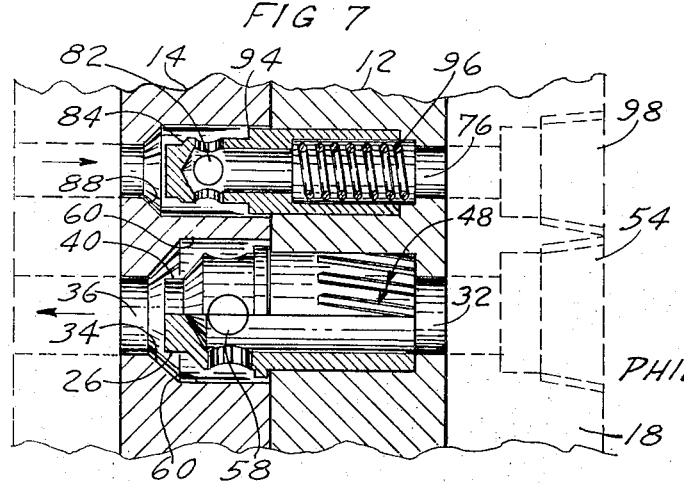
FIG. 7 is a view in cross-section and on an enlarged scale taken along the line 7—7 of FIG. 1 and depicting a second outlet flow path from the metering pump.

When the spool 26 reaches its closed position, the pilot diameter 40 of the spool is nearly flush with the outer surface of the cover plate 14 and thereby prevents the formation of a slug in the outlet passage 36 as the sealing surface 38 engages the seat 34 in the cover plate. Movement of the spool 26 to the left as seen in FIGS. 2 and 7 also uncovers a drain opening 62 extending between the counterbore 30 and an enlarged pipe-tapped counterbore 64 which is closed by a plug 66. Thus while the spool 26 is in its closed position, lines conducting molten nylon from the master pump to the valve body 10 may be drained for purging in the event that such purging is considered desirable.

In order to prevent the reverse flow of molten nylon from the high pressure lines from the pump 24 when the pump stops or is removed, there is provided, for each high pressure stream, a valve such as that shown in FIG. 2 and comprising a spool 70 pressed to the left toward a closed position by a spring 72. The spool 70 is slidable in a counterbore 74 which forms an enlargement of an outlet passage 76 in the base plate 12. The passage 76 is aligned with an outlet 78 formed in the bracket 18 and tapped to receive a conduit connecting the outlet of the pump with a related spinneret. The spool 70 is hollow, being formed with a longitudinal passage 80 to which molten nylon is admitted through radial openings 82 when the spool 70 is in its open position as depicted in FIG. 2. A conical sealing surface 84 and a pilot diameter 86 on the spool 70 are arranged to cooperate respectively with a valve seat 88 and a narrowed throat 90. While the pump is operative, the presence of nylon from the pump 24 pressing against the end of the pilot diameter 86 overcomes the force of the spring 72 and the spool remains in open position depicted in FIG. 2 thereby providing an outlet for the pump 24 through the throat 90, between the sealing surface 84 and the seat 88 around the spool 70 in a counterbore 92 through the radial passages 82 into the interior of the spool 70 and to the outlet 78. When the pump ceases to function, the spring 72 presses the spool to the left so that the outer end of the pilot diameter 86 extends to a position nearly flush with the outer surface of the cover plate 14 as the sealing surface 84 engages the valve seat 88.

There is shown in FIG. 7 a second outlet valve including a spool 94 pressed by a spring 96 and associatd with an outlet 98 in the plate 18. The spool 94 is identical to the spool 70 in shape and function and is included in the construction when the present valve assembly is to be employed in conjunction with a pump according to the above identified Lundstrom patent which produces two outlet streams. Each of the spools 70 and 94 is interposed between one of the outlet passages of the pump 24 and its related conduit connected to the bracket 18 to 78 and 98 respectively. Since the valve assembly already described includes valving elements for controlling one inlet to the metering pump and two outlets from the metering pump, it is characterized by a very high degree of component density within the valve body 12, 14. The valve assembly may however be simplified for use in conjunction with a metering valve having a single output stream by eliminating the second spool 94 and its associated spring and passages in the valve body.

Thus far in the specification, the present valve has been described as particularly suitable for the high temperature and pressure environment encountered in the metering of thermoplastic fibre forming synthetic material such as nylon. The valve parts intended to operate in such an environment and also to withstand the even higher temperature reaching approximately 1,000°F., are manufactured of highly heat-resistant steels such as those having high carbon high chrome analyses. These high temperatures may be reached in the event that nylon is allowed to solidify within the valve body and must be burned out. It is obvious, however, that a valve according to the present invention is also useful in conjunction with pumps for metering fibre-forming synthetic materials such as rayon, for example, which are extruded through spinnerets at much lower temperatures and pressures. The corrosive nature of the rayon streams requires the use of appropriately resistive materials for the valve parts in accordance with practices already conventional for the parts of corresponding metering pumps. Whether for the higher pressures and temperatures required in nylon processing applications or for the lower pressures and temperatures but greater corrosiveness of other materials such as rayon, it is clear from the foregoing that there is provided according to the present invention a plurality of valving functions in a common compact valve body expecially suitable for mounting adjacent a conventional metering pump. It is accordingly not intended that the scope of the present invention be construed as limited to valves intended for a specific application but that it be interpreted as defined by the appended claims.

Having thus disclosed my invention, what I claim as new and desire to secure by Letters Patent of the United States is:

1. A valve assembly for controlling inlet and outlet streams of fibre forming material to and from a metering pump comprising a body, a manually operable valve in the inlet stream to the pump, the valve comprising a hollow spool, means for imparting an angular motion to the spool about its axis and including gear teeth formed in the spool and a worm rotatable in engagement with the gear teeth and a cam groove in the spool engageable by a follower for translating the angular motion into a longitudinal motion and a valve automatically operable to interrupt each outlet stream when the pump is stopped.

2. A valve assembly according to claim 1 further characterized in that the body is formed with a passage having a major diameter providing a guideway for the spool, a restricted throat and a seat against which the spool closes, the spool including a sealing surface adapted to engage the seat and a reduced diameter adapted to enter the throat to displace fibre forming material from the throat upon closure of the manually operable valve.

3. A valve assembly according to claim 1 further characterized in that the automatically operable valve comprises a spool having a major diameter guided in the body, a sealing surface and a reduced diameter adapted to displace fibre forming material upon closure of the automatically operable valve.

4. A valve assembly for controlling an inlet stream of thermoplastic fibre-forming material moving toward a pump and a separate outlet stream of the material moving away from the pump comprising a body having an outer surface, and a passage including a cylindrical guideway terminating at the outer surface in a narrowed inlet throat and a conical seat interposed between the guideway and the narrowed throat, a valve spool having a major diameter slidable in the guideway, a conical sealing surface adapted to engage the seat and a reduced diameter located and dimensioned substantially to fill the narrowed throat for displacing fibre-forming material from the throat when the conical surface engages the seat, manually operable means for moving the spool between open and closed positions and a check valve also slidable in the body in the outlet stream and automatically operable in response to a drop in pump pressure to prevent return flow of the stream toward the pump when the pump is stopped.

5. A valve assembly according to claim 4 further characterized in that the body includes a second passage also including a cylindrical guideway terminating at the outer surface in a narrowed outlet throat and a conical seat interposed between the guideway and the narrowed throat and the check valve also comprises a spool having a major diameter slidable in the guideway, a conical sealing surface adapted to engage the seat and a reduced diameter located and dimensioned substantially to fill the narrowed throat when the conical surface engages the seat.

* * * * *